N. O. BOND.

Brazier for Cooking Stoves.

No. 52,519.

2 Sheets—Sheet 1.

Patented Feb. 13, 1866.

WITNESSES:

INVENTOR.
Nathan O Bond
by his attorney

2 Sheets—Sheet 2.

N. O. BOND.

Brazier for Cooking Stoves.

No. 52,519.

Patented Feb. 13, 1866.

WITNESSES:

INVENTOR.
Nathan O. Bond
By his attorney
R. H. Eddy

UNITED STATES PATENT OFFICE.

N. O. BOND, OF HYANNIS, MASSACHUSETTS.

BRAZIER FOR COOKING STOVES OR RANGES.

Specification forming part of Letters Patent No. 52,519, dated February 13, 1866.

*To all whom it may concern:*

Be it known that I, NATHAN O. BOND, of Hyannis, in the county of Barnstable and State of Massachusetts, have invented a new and useful or Improved Brazier for Cooking Stoves or Ranges; and I do hereby declare the same to be fully described in the following specification and represented in the accompanying drawings, of which—

Figure 2:
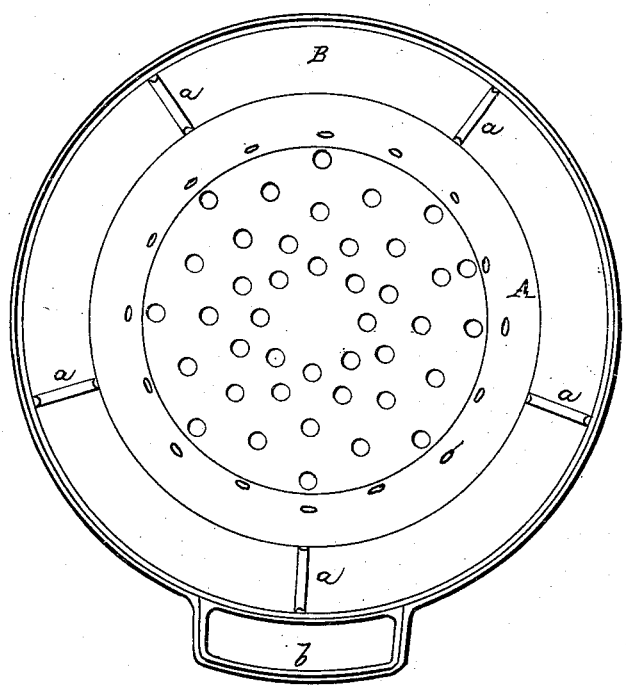
Figure 2:
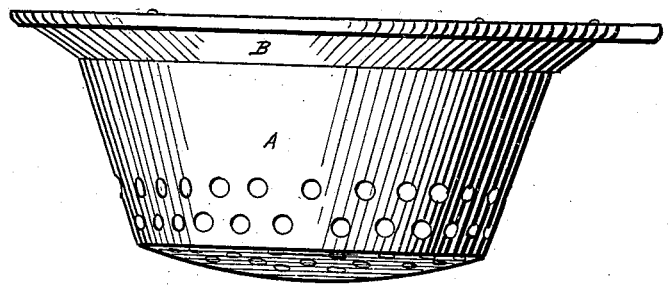
Figure 3:
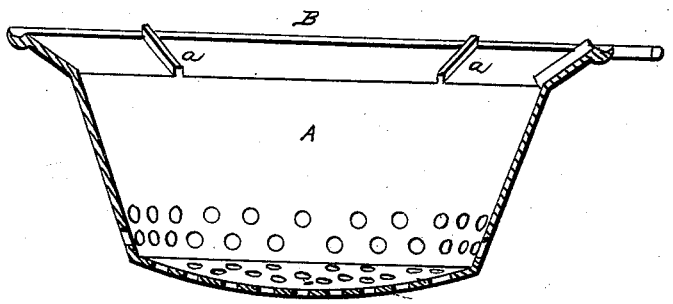

Figure 1 is a top view, Fig. 2 a side elevation, and Fig. 3 a transverse section, of it.

The said brazier is intended to be used in the boiler-pot opening of the covering-plate of the fire-place of a stove or range. The purpose of the said brazier is to hold charcoal or fuel in a state of ignition, to support over such fuel an article to be cooked or a vessel to be heated, and to cause the air for supporting combustion to pass into the mouth of the brazier, and thence go down through the fuel, whereby the smoke, gases, and volatile products of combustion, instead of being carried upward against the object to be heated, warmed, or cooked, as the case may be, to the injury thereof, will be turned in a direction away therefrom, and by going through the mass of fuel will be more or less burned, so as to add to the heat radiated upward therefrom.

In the drawings, A is a pan or basin having the form of a conic frustum and its bottom pierced with holes. It also has a flaring rim, B, provided with a series of ledges, *a a a*, raised or projecting upward from such rim. A handle, *b*, may project from the periphery of the rim. The said ledges serve to support a pot, pan, plate, or vessel to contain a fluid or article to be cooked or heated, and they so elevate it above the upper surface of the rim B as to form between them (the rim and the vessel, plate, or pan) a series of passages for air to pass into the mouth of the pan, and thence to fuel when in the brazier.

The article so made is believed to be an improved appliance for a range or stove, and will often save the necessity of making a fire within the fire-place of the stove or range. Therefore it becomes an excellent means of saving fuel, as a small amount of charcoal thrown into it will often suffice to perform the cooking operations, which, to be performed by the stove or range, would require an expenditure of a much larger amount of fuel.

I do not claim a brazier or portable furnace as made with two series of holes through its sides, one series of them being near its bottom and the other near its top. The distinguishing differences between this and my improved brazier are the flat flaring rim and the ledges arranged thereon and extending above it, the same enabling the article to be used for supporting any one of a set of vessels, pans, or kettles varying in size, and also to receive, without obstructing the draft, the flush cover or a vessel adapted to fit the stove-hole.

I claim—

The brazier A B, when constructed, as herein described, with ribs *a a*, which adapt it to receive vessels of various diameters, or of the same diameter as the stove-hole, without obstructing the draft.

N. O. BOND.

Witnesses:
R. H. EDDY,
F. P. HALE, JR.